(12) United States Patent
Eckardt

(10) Patent No.: US 12,491,014 B2
(45) Date of Patent: Dec. 9, 2025

(54) OSTEOSYNTHESIS PLATE SUITABLE AS A REPLACEMENT OF A SYNARTHROSIS

(71) Applicant: UNIVERSITÄTSSPITAL BASEL, Basel (CH)

(72) Inventor: Henrik Eckardt, Binningen (CH)

(73) Assignee: Universitätsspital Basel, Basel (CH)

(*) Notice: Subject to any disclaimer, the term of this patent is extended or adjusted under 35 U.S.C. 154(b) by 123 days.

(21) Appl. No.: 18/280,020

(22) PCT Filed: Mar. 3, 2022

(86) PCT No.: PCT/EP2022/055474
§ 371 (c)(1),
(2) Date: Sep. 1, 2023

(87) PCT Pub. No.: WO2022/189267
PCT Pub. Date: Sep. 15, 2022

(65) Prior Publication Data
US 2024/0138889 A1  May 2, 2024

(30) Foreign Application Priority Data

Mar. 11, 2021 (EP) ...................................... 21162117

(51) Int. Cl.
*A61B 17/80* (2006.01)
*A61F 2/30* (2006.01)

(52) U.S. Cl.
CPC ...... *A61B 17/8066* (2013.01); *A61B 17/8052* (2013.01); *A61F 2/30771* (2013.01); *A61F 2002/30784* (2013.01)

(58) Field of Classification Search
CPC .................... A61B 17/8066; A61B 17/8071
See application file for complete search history.

(56) References Cited

U.S. PATENT DOCUMENTS

2005/0165401 A1  7/2005  Pack
2017/0119504 A1* 5/2017  Kook ................... A61C 8/0096

FOREIGN PATENT DOCUMENTS

| CN | 112107356 A | 12/2020 |
| DE | 2603087 B1 | 6/1977 |
| DE | 102005032026 B3 | 12/2006 |
| DE | 102012010024 A1 | 11/2013 |
| EP | 2494934 A1 | 9/2012 |
| EP | 0861571 B1 | 4/2013 |
| EP | 2438953 B1 | 8/2016 |
| EP | 2704974 B1 | 5/2017 |

OTHER PUBLICATIONS

Maschinenbau-Wissen; "Federkonstante-Grundlagen;" 2009 Maschinenbau-Wissen.de; https://www.maschinenbau-wissen.de/skript3/mechanik/kinetik/114-federkonstante.
Extended European Search Report dated Sep. 17, 2021 in related/corresponding EP Application No. 21162117.2.
International Search Report and Written Opinion mailed Jun. 27, 2022 in related/corresponding International Application No. PCT/EP2022/055474.

* cited by examiner

*Primary Examiner* — Olivia C Chang
(74) *Attorney, Agent, or Firm* — PATENT PORTFOLIO

(57) ABSTRACT

An osteosynthesis plate as replacement of a synarthrosis includes two fixation plate segments for securing the osteosynthesis plate to two bones. The osteosynthesis plate has a connecting segment interconnecting the two fixation plate segments, the connecting segments protruding from the fixation plate segments.

13 Claims, 4 Drawing Sheets

OSTEOSYNTHESIS PLATE SUITABLE AS A REPLACEMENT OF A SYNARTHROSIS

BACKGROUND AND SUMMARY OF THE INVENTION

Exemplary embodiments of the present invention relate to an osteosynthesis plate.

Osteosynthesis plates, which are suitable for replacing a synarthrosis, are typically strip-shaped or formed as L-angled flat metal bars. The problem is that a pelvis or other body parts are subject to constant movement. During movement, corresponding tensile and compressive forces act in the plane of the metal bar during movement, which will be transmitted to the screws. This causes the bone screw to constantly move back and forth, widening the drill hole within the bone, which can cause the screw to loosen from its anchoring in the bone or cause the screw to break or the plate to fracture.

DE 26 03 087 B1 discloses a generic osteosynthesis plate with fixation plate segments for stabilizing a symphysis, each of which has a support surface for support on a pelvic edge and a connecting segment protruding therefrom, which protrudes from the fixation plate segments in such a way that it is suitable for extending along the inner side of a human pelvis. The material of the osteosymphyseal plate is thermoplastic and softens with heat to conform to the anatomy of the symphysis.

DE 10 2012 010 024 A1 discloses an implant carrier which, however, does not correspond to the generic embodiment of the preamble of the present invention. The aim of the features of the preamble is the definition of an object with which a special force redirection into the implant is accompanied during a movement. In contrast to DE 26 03 087 B1, the introduced movement-related force is not diverted perpendicularly to the fixation plate into the connecting segment. Rather, in DE 10 2012 010 024 A1, due to the direct and shortest connection of two fixation plates, tensile forces act on precisely these fixation plates, resulting in lateral loading of the connecting elements (bone screws and the like). Furthermore, the disclosed construct consists of at least 13 parts, which is assembled and allows lateral movement of the two bone plates by means of a traverse titanium rod. The movement takes place only in one plane—the lateral plane and the extent of the movement is defined by the length of the slot in the traverse (FIG. 1, no 20). The traverse slides without resistance.

The same applies to US 2005/0165401 A1. The plate is a plate for stabilization of acetabular fractures (fractures of the acetabulum)—i.e., a fracture in the region of the pelvis—but locally 10 cm away from the symphysis. The special aspect for this plate is an additional surface in the middle of the plate whose purpose is to support the acetabular fracture. The surface supports lamina quadrilateralis and prevents protrusion/medialization of the femoral head. The construct has a different objective in structure, design, and purpose than the present invention.

DE 10 2005 032 026 B3 discloses a plate with two plate sections connected at different angles. The plate is intended for jaw surgery and different angles between plate sections are adapted to the specific geometry of the jaw. FIGS. 14a and 14b show two plates connected with a U-shaped metal plate. The purpose of this connection is to be able to bypass nerves, thus preventing nerve entrapment under the plate. Also, the bending of the U-shaped part is possible and thus the plate can be better adapted to the geometry of the jaw as shown in paragraphs [0066] and [0067] of DE 10 2005 032 026 B3. The bending is therefore "in plane", i.e., along the plane of the support surfaces of the fixation elements, and therefore cannot cushion and stabilize any axial displacement of the pelvic bones against each other.

Thus, DE 26 03 087 B1 is the only known prior art osteosynthesis plate that transfers the force application and redirection in the desired direction. However, the osteosynthesis plate of the generic DE 26 03 087 B1 is designed with a broad surface and encloses or embraces the pelvic edge and the inner side of the pelvis like a cuff. In particular, the surface of the plate is brought to maximum size so that a high rigidity of the plate is achieved. Also, screws are screwed close to the symphysis so that the plate achieves maximum stability. In addition, the plate lies on the outer surface of the pelvis—that is, between the skin and the bone.

However, due to the wide-area design, particularly in the area of the connecting segment, the fixation plates are rigidly fixed. This is problematic in that the connected pelvic bones themselves move against each other as a result of movement, so that rigid fixation can lead to gradual loosening of the connection points between the osteosynthesis plate and the pelvic bone.

Based on the aforementioned problem, exemplary embodiments of the present invention provide an osteosynthesis plate that enables a redirection of force and also partially counteracts a movement-induced force by elastic deformation.

It is a basic idea of the present invention to design an osteosynthesis plate that is not rigid, but rather resilient and at the same time ergonomic. The degree of springing is known to those skilled in the art as spring stiffness and is usually indicated by a so-called spring constant. The spring constant is a value attributed to a spring. The spring constant is used to design and calculate the spring for the desired purpose. The spring constant is a complex physical quantity and can be influenced by various factors of the spring. It is calculated from the deflection of the spring with the necessary and resulting force. (See, among others, https://www-.maschinenbauwissen.de/skript3/mechanik/kinetik/114-federkonstante). Thus, a spring constant is known to those skilled in the art not as a result to be achieved, but as a physical quantity and thus as a technical characteristic for describing a spring element. Spring constants have therefore also long been used in patent literature as technical features to describe the softness or hardness of a spring element. Examples of a spring constant as a suitable feature for characterizing a spring element are the following granted EP patents:

In EP 2 704 974 B1 (claim 1), a take-up device with a spring constant between 0.5 and 5 N/m was characterized.

In EP 0 861 571 B1 (claim 1), a foam material was characterized by its dynamic spring constant of at least $4.4*10^4$ N/m.

In EP 2 438 953 B1 (claim 12), the spring of a contractible breathing tube was characterized on the basis of its spring constant.

However, numerous other examples of the use of the spring constant as a technical feature can be found in the patent literature.

An osteosynthesis plate according to the invention should be suitable for replacing a synarthrosis. Here, the osteosynthesis plate has two fixation plate segments for securing the osteosynthesis plate to two bones of a pelvis.

Each of the fixation plate segments defines a support surface. This can be flat, curved or individually adapted to the patient. The support surface serves to support the pelvic edge of a pelvic bone, especially in the application of the symphysis replacement in the pelvic region, while the connecting element protrudes from the fixation plate segments in such a way that it extends at least partially along the inner side of the pelvis or over a partial region of the inner side of the pelvis, and particularly preferably rests thereon.

Regardless of the aforementioned preferred application, each support surface, regardless of its shape, has at least one normal vector that is perpendicular to the support surface.

The osteosynthesis plate also has a connecting segment that interconnects the two fixation plate segments and which protrudes from the fixation plate segments. While the fixation plate segments define a connecting plane in continuation of their extension to a theoretical connection of the fixation plate segments at the shortest distance, the connecting segment preferably lies outside this connecting plane.

In this case, the connecting segment can be arranged at the edge on the fixation plate segment and can be angled, in particular bent, by an angle of more than 45° relative to a fictitious extension of the support surface. This angled bend designates an alignment with respect to an in-plane (alignment in the plane of the support surface) or a bend with respect to the aforementioned fictitious extension. It is to be understood as an indication of an amount and can therefore also represent a negative value for an angle indication in the strictly mathematical sense.

Conversely, the connecting segment can advantageously deviate by less than 45° from the normal vector.

Advantageously, the osteosynthesis plate according to the invention can distribute the force applied to the junction with the bone over a longer period of time due to its elasticity, thus cushioning the load on the junction.

Starting from the fixation plate segment, in a preferred embodiment variant, a mechanical interface can be arranged at the edge thereof as part of the connecting segment, which is formed as an arc or bend. Starting from this mechanical interface, the connecting segment extends at the aforementioned angle. The mechanical interface takes up less than 10%, preferably less than 5%, of the total length of the mechanical connecting segment. In the context of the present invention, the mechanical interface can preferably be a welding point or a bending point.

In the further extension, the connecting segment extends at an angle of less than 45° to the normal vector. This means that there may also be partial regions of the connecting segment having an angle of more than 45° with respect to the connecting segment. However, this is preferably only, as previously defined, only a small section of the connecting segment.

In order to additionally achieve a force reduction of the acting forces, the connecting segment is designed as a spring element. In this function, the connecting segment is designed in such a way that a free-swinging fixation plate segment of the osteosynthesis plate in the unilaterally fixed state is deflected relative to the second fixation plate segment by a distance $\Delta s$ of at least 1.5 mm, preferably 1.8 to 5.0 mm, when a force of 350 N is applied from a direction parallel to the normal vector. The deflection and the preceding definition thereby replace the specification of a spring constant for characterizing the connecting segment as a spring element. The force reduction causes the forces acting on the bone screws to be reduced.

The connecting segment can advantageously be designed as a flat connecting segment with an average plate thickness which is at least 1.5 times less, preferably 2-5 times less, than the average width of the flat segment. This design ensures particular mechanical stability of the connection.

The length of the connecting segment can be at least twice as long as the shortest distance between the edges of the two fixation plate segments, thereby achieving a high degree of flexibility for compensatory deformation of the osteosynthesis plate.

For a similar reason, it is also advantageous if the length of the connecting segment is at least five times as long as the average width of the connecting segment.

Particularly good mechanical stability combined with optimum spring action were observed if the connecting segment had a "W" or "U" shape.

Preferably, the connecting segment protrudes by more than 45°, preferably between 85-95°, relative to the fixation plate segment. Particularly preferably, this can be a bend relative to the fixation plate segment with a corresponding bending range.

For a stable and at the same time force-distributing connection to a bone, the fixation plates can have at least two, preferably three, drilled holes for the passage of a respective mechanical connecting means, in particular a bone screw.

Preferably, the osteosynthesis plate is formed in one piece to allow optimal force redirection through the material. For a spring effect and for the distribution of material stresses, it is favorable if the entire osteosynthesis plate is made of a ductile material, particularly preferably of a titanium and/or a stainless steel and/or a metal alloy comprising titanium and/or iron.

To improve compatibility, it is advantageous if the osteosynthesis plate has a coating, in particular of an absorbable material or with an anti-inflammatory agent, at least in sections. This can be particularly in the area of the contact surfaces.

From a manufacturing point of view, it is favorable if the fixation plate segments and the connecting segment have the same plate thickness. Minor deviations of 10% of the plate thickness or less are negligible. Furthermore, this does not create any additional mechanical weak points.

The fixation plate segments have a longitudinal extension and a transverse extension perpendicular thereto, with the connecting segment arranged at the edge and centrally relative to the longitudinal extension. As a result, the force transmission is evenly distributed to all drill holes of the fixation plate segment in the event of deformation.

Preferably, an interface between a respective fixation plate segment and the connecting segment is formed as a bend, preferably with a bending radius that is at least larger, particularly preferably at least twice as large, as the average plate thickness of the connecting segment, so that force redirection is carried out in an optimized manner.

For additional deformation into a second dimension, the connecting segment can be curved and convex towards the fixation points of the fixation plate segments. This achieves even better force reduction.

As can already be seen from the context of the description, an osteosynthesis plate in the context of the present invention is not to be understood as an exclusively flat object, but it can have one or more partial segments, for example a bent connecting segment, which can project in particular at an angle from a plate plane, preferably also to more than 45°, in particular vertically.

BRIEF DESCRIPTION OF THE DRAWING FIGURES

Further advantages, features and details of an osteosynthesis plate according to the invention will be apparent from the following description, in which an exemplary embodiment of the invention is explained in more detail with reference to the accompanying drawings. The person skilled in the art will expediently also consider the features disclosed in combination in the drawings, the description and the claims individually and combine them to form useful further combinations. In particular, there are a variety of ways in which they may be modified and further illustrated within the scope of the present invention, wherein:

DETAILED DESCRIPTION

Figure 1:
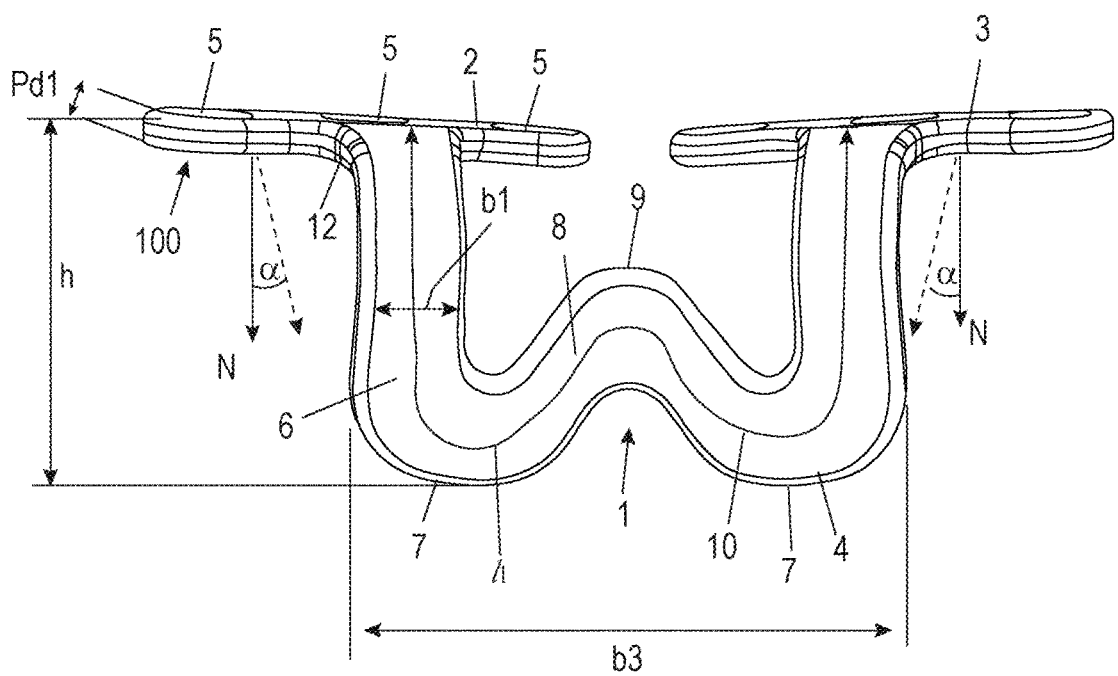
FIG. 1 shows a view of an embodiment variant of an osteosynthesis plate according to the invention in the coronary plane or antero-posterior plane.

The exemplary embodiment shown in FIGS. 1-5 illustrates an osteosynthesis plate 1 for fixation of a pelvis in particular due to a trauma-induced rupture of the symphysis.

Such an injury provides instability of the pelvic ring and must be stabilized surgically. Known bone plates are formed in a strip-shaped straight or angled manner.

The osteosynthesis plate 1 according to the invention has a first and a second fixation plate segment 2 and 3, as well as a flat connecting segment 4, which is arranged between the two fixation plates 2, 3 and connects them to each other. The flat connecting segment 4 has an average plate thickness Pd2 of preferably at least 2 mm, preferably between 2.5 to 5 mm, in particular 3 mm+/−0.2 mm. Particularly preferably, the plate thickness Pd2 of the flat connecting segment 4 is substantially uniform, i.e., over more than 90% of the length $l_1$ of the flat connecting segment 4.

The flat connecting segment 4 preferably has a mean width b1 of at least 5 mm, preferably between 7-15 mm, in particular 9 mm+/−0.8 mm. Particularly preferably, the plate thickness Pd2 of the flat connecting segment 4 is substantially uniform, i.e., over more than 90% of the length $l_1$ of the flat connecting segment 4.

The first and second fixation plates 2 and 3 each define a first and a second support surface 100 with a normal vector N. The two support surfaces 100 can lie parallel to one another or on a common plane. However, the two support surfaces 100 may also be curved and/or arranged at an angle to each other.

Starting from one of the two normal vectors N, or a vector extending parallel to this normal vector, the flat connecting segment 4 protrudes from the respective fixation plate 2 or 3 at an angle α of less than 45°, in particular at an angle of less than 5°, with respect to the respective normal vector or the parallel vector. In FIG. 1, the flat connecting segment 4 protrudes from the drawing plane by this angle. The protrusion occurs in such a way that an edge-side material segment arranged on the fixation plate segments, the flat connecting segment, is bent relative to the fixation plate segments. The bend is also referred to hereinafter as the mechanical interface 12 and is a portion of the flat connecting segment 4.

Each of the fixation plates 2 and 3 has at least one, preferably at least three fixation points 5 for securing the fixation plate to a bone, in particular a pelvic bone. The fixation points 5 can be designed as drilled holes through which fixation with the bone is achieved via corresponding screws 6, e.g., bone screws.

The flat connecting segment 4 is preferably formed in such a way that it has a greater length $l_1$ than the shortest direct distance r between two least spaced fixation points 5 between the two fixation plate segments 2 and 3. In other words, the shortest distance r each from a fixation point 5 of the first fixation plate 2 to a fixation point 5 of the second fixation plate 3 is determined. The length $l_1$ of the flat connecting segment 4 is greater than this distance r.

The osteosynthesis plate 1 is preferably formed in one piece and consists of a ductile material, preferably a metal, in particular titanium and/or stainless steel or an alloy with at least one of the two metals titanium and/or iron.

Figure 2:
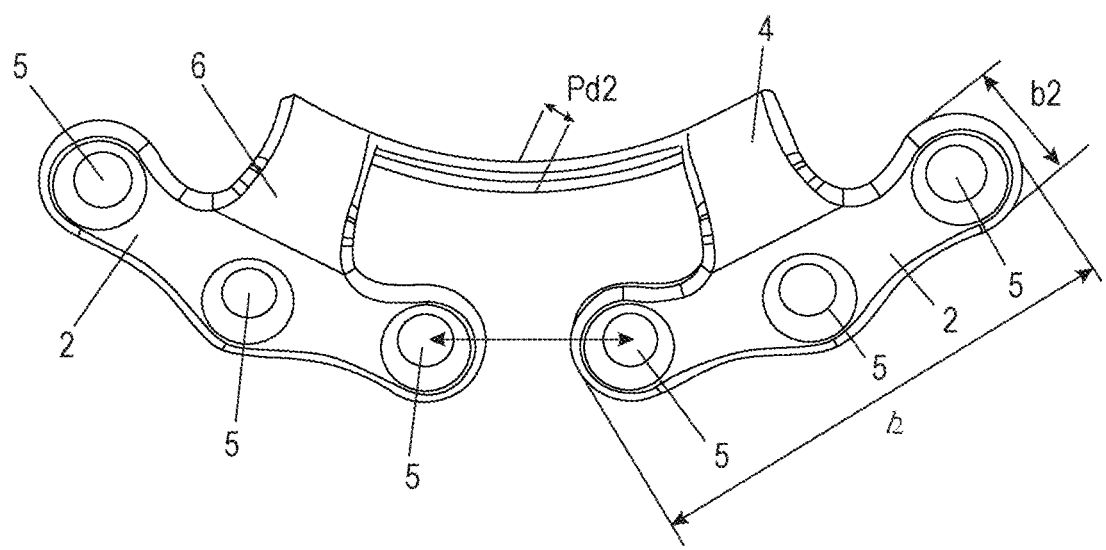
FIG. 2 shows a view of the osteosynthesis plate according to the invention in the axial plane.
Figure 3:
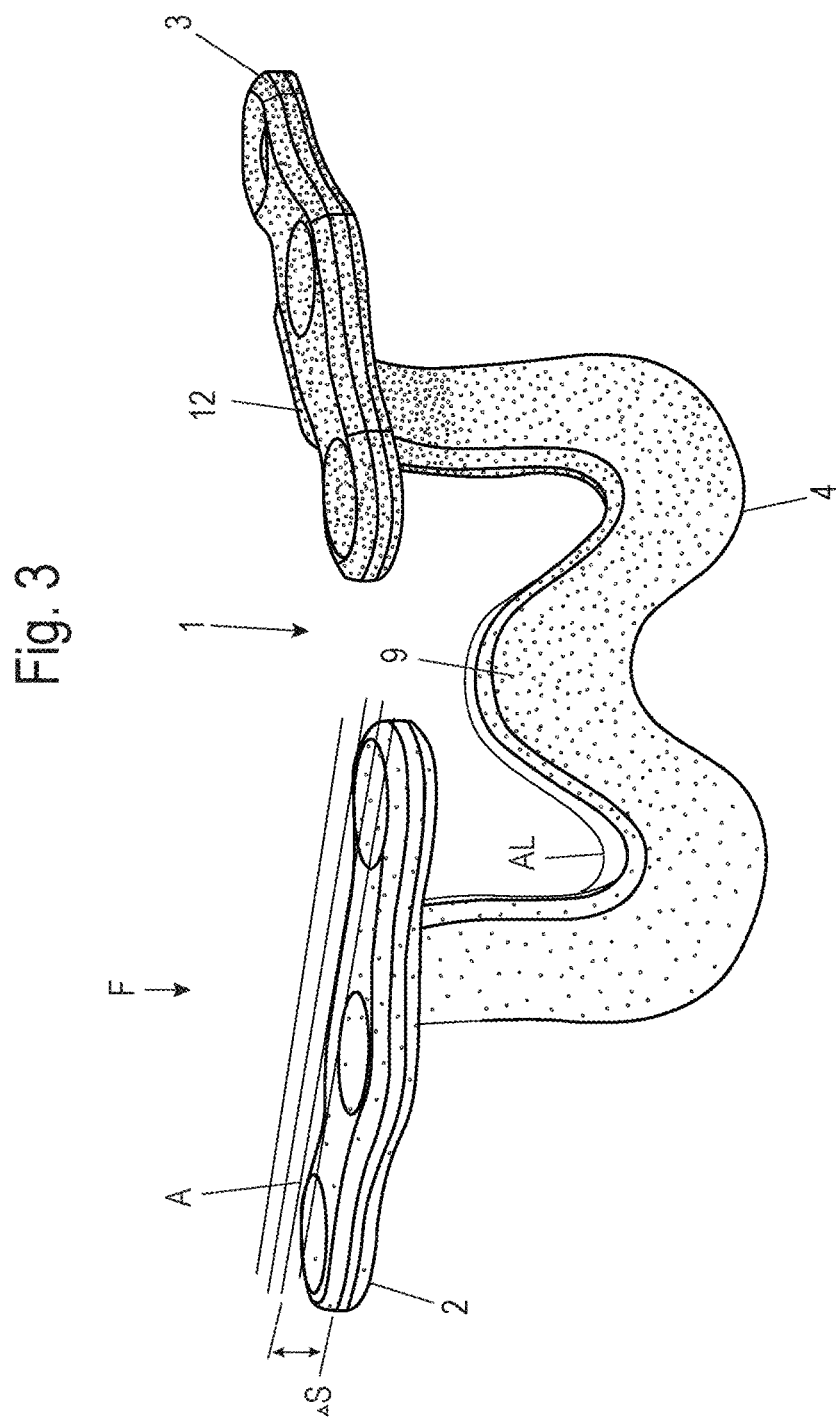
FIG. 3 shows a force distribution display in perspective view of the osteosynthesis plate according to the invention.

The fixation plate segments 2, 3 in the variant of FIGS. 1-3 is designed as a three-hole plate, i.e., it has three holes for the passage of bone screws 6 and for the fixation of the osteosynthesis plate to the two pelvic bones 13 that have been separated from each other by a complete or non-complete rupture of the symphysis. The holes are arranged in series in the longitudinal direction of the fixation plate segment 2 or 3. The bores correspond to the aforementioned fixation points 5. The bores may be selected to pass bone screws between 2-5 mm in diameter, preferably 3-4 mm.

The flat connecting segment 4 extends from the fixation plate segment 2, 3 at the edge at the level of the center hole and is angled or bent at a substantially perpendicular angle from the fixation plate segment 2, 3.

Starting from the fixation plate segment 2, the flat connecting segment 4 has a first region 6 with a first negative slope up to a first minimum 7, with the negative slope being directed away from the fixation plate segment.

Next, the flat connecting segment 4 has a second region 8 with a first positive slope, which runs up to a first maximum 9. The length of this second region 8 is smaller, preferably by more than 30%, than the length of the first region. The positive slope is thereby directed towards the fixation plate segment 2. The maximum 9 thus has a distance from the first and second fixation plate segments 2 and 3 and from their connecting axis.

Next, the flat connecting segment 4 has a third region 10 with a second negative slope, which in turn extends to a second minimum 11. The first and third regions 6 and 7 are of essentially equal length. The minima 7 and 11 are substantially at the same level when the osteosynthesis plate is in the relaxed state. The maximum 9 is located at the same distance from the two minima 7 and 11. The shape of the flat connecting segment 4 corresponds to that of a "W".

As explained previously, but not shown in the figures, the flat connecting segment can also have the shape of a "U" in an alternative embodiment variant.

The maximum width $b_3$ of the "W" 's preferably corresponds to at least 30 mm, more preferably between 35-60 mm, especially preferably 45 mm+/−5 mm. The maximum height h of the "W", or the length of the first region 6, measured from the surface at the fixation plate segment 2, is preferably at least 15 mm, preferably 20-45 mm, particularly preferably 30 mm+/−3 mm.

Generally formulated, in a preferred embodiment variant of the invention, the width "W" of the flat connecting segment 4 is greater than its height "H".

The shape of the flat connecting segment 4 is also convex, relative to the position of the fixation plate segments 2 and 3.

The length $l_2$ of the fixation plate segment 2 is preferably between 25-45 mm, preferably 40 mm+/−4 mm. The average width of the fixation plate segment $b_2$ over its entire length is preferably between 6-13 mm, preferably 10 mm+/−1 mm.

The distance r of the fixation plate segments 2, 3 from edge to edge is preferably less than the longitudinal extension of a fixation plate segment. It can preferably be between 6-10 mm, preferably 8 mm+/−0.5 mm. However, the distance between the fixation plate segments 2, 3 can vary under deformation and formation of restoring forces. The aforementioned distance refers to an osteosynthesis plate in the untensioned state and unmounted state. In the unmounted state, the osteosynthesis plate is not yet fixed to one or more bones.

The average plate thickness Pd1 of the fixation plate segments 2, 3 can correspond to the average plate thickness of the flat connecting segment of plate thickness of at least 2 mm, preferably between 2.5 to 5 mm, in particular 3 mm+/−0.2 mm.

As an alternative to the preferred variant of the W-shape of the osteosynthesis plate 1, other shapes such as a U-shape or a V-shape are also conceivable. The aforementioned designations such as mean width or mean plate thickness imply that a variation may occur in the course of the respective segment and that, in the event of such a variation, it is necessary to determine an average value with a measurement of the values at different positions of the respective segment. The data such as length, width, etc. always refer to an osteosynthesis plate in the unmounted and unloaded or undeformed state.

From the above values, it can be deduced that the width of the flat connecting segment 4 is at least 3 times as large, preferably 4-8 times as large, as the edge-to-edge distance between the two fixation plate segments 2, 3.

Due to its constructional design, the osteosynthesis plate acts as a resilient connecting part, which creates a movement compensation between the pelvic bones and at the same time has sufficient mechanical strength to prevent a widening of the distance between the pelvic bones in the area of the symphysis.

The spring action is optimized for this area, so that the osteosynthesis plate can replace the restoring and tensile forces of a symphysis. Tests were carried out for this purpose.

During the test, one of the two fixation plate segments (right leg) was fixed, in particular screwed, and the second fixation plate segment (left leg) was free to oscillate. The situation is shown in FIG. 3.

If a compressive force F is now applied in the direction of the normal vector to the surface of the fixation plate segment 2 opposite the support surface 100 and parallel to this vector, the osteosynthesis plate deforms under formation of a restoring force. When the compressive force is removed, the osteosynthesis plate 1 returns to its initial position AS.

Next, 1200 full cycles over 250 seconds were applied to the freely oscillating fixation plate segment for motion simulation. A full cycle consists of the application of a compressive force, e.g., by a compression rod, to the fixation plate segment at a defined force and of the return of the osteosynthesis plate to its initial position when the compressive force is removed.

The average applied compressive force was 351.5 N and resulted in a deformation Δs of 2.885 mm. This deformation corresponds to the height difference of the free-swinging fixation plate segment compared to its initial position. From FIG. 3, the different force distribution within the osteosynthesis plate can be seen in the hatched representation. A plastic deformation could not be observed, since there was no variance in the initial position.

In a second test, 9999 full cycles were then performed with an average compressive force F of 357.6 N. The deflection or deformation Δs of the freely oscillating fixation plate segment relative to its initial position or starting position AS was 2.945 mm. In this case, a slight negligible deformation of 0.061 mm was observed.

Thus, the osteosynthesis plate can be described as dimensionally stable when subjected to 10000 full cycles at a force of approximately 350 N.

Experiments with healthy subjects have also shown that the symphysis is alternately loaded with 170 N during the gait cycle and maximum loads of up to 370 N occur during running, resulting in a movement of about 2-3 mm. These forces can also be ideally absorbed by the osteosynthesis plate according to the invention and cushioned accordingly.

The deformation Δs of the free-swinging fixation plate segment of the unilaterally fixed osteosynthesis plate when a force is applied to this fixation plate segment in the direction of the normal vector is preferably between 1.8 to 5.0 mm when a force of 350N is applied.

FIG. 3 shows the force distribution when force is applied to the freely oscillating fixation plate segment 2. The density of the dotting indicates the extent of the material stresses in response to the force application. As can be seen, the force application is greatest in the region of interface 12 and the fixed fixation plate segment. Material stress in this area results in an axially directed force, i.e., on the non-displayed screw heads and not as a laterally directed force along the plane of the fixation plate segment, which would result in gradual widening and loosening of the screw-bone connection.

Figure 4:
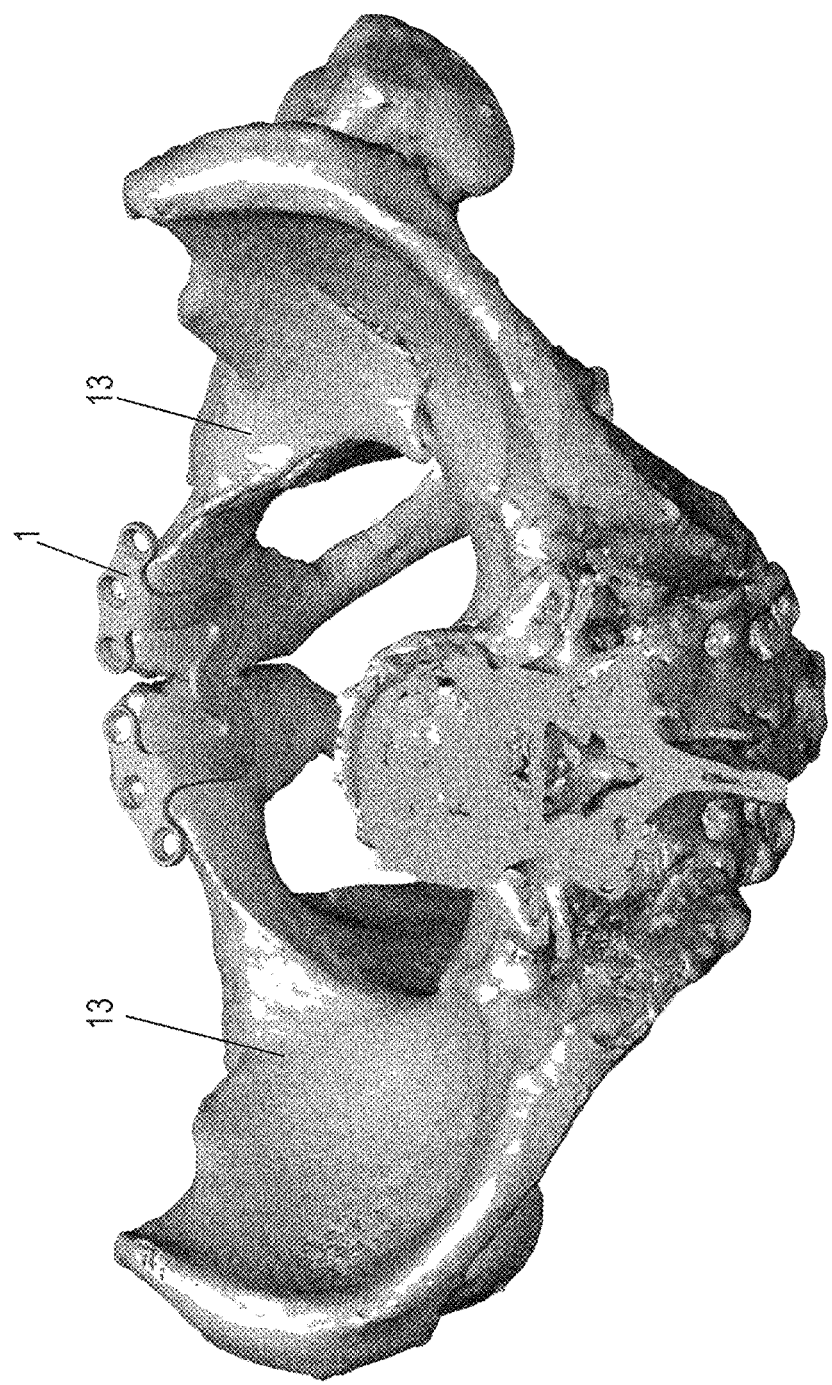
FIG. 4 shows a schematic representation of the osteosynthesis plate in the assembled state in an application as a replacement of a symphysis.

The example in FIGS. 1-5 refers primarily to an osteosynthesis plate as a replacement of the fibro-cartilaginous connection between the pubic branches in a rupture of the symphysis. This application is shown in FIG. 4.

Figure 5:
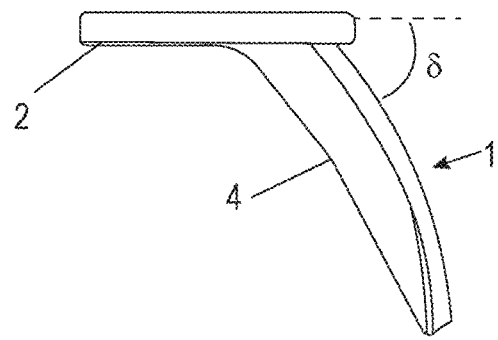
FIG. 5 shows a view of the osteosynthesis plate according to the invention of FIGS. 1-4 in the sagittal plane.

As can be seen from FIG. 5, the angle between the support surface and the connecting segment can be, for example, 130° or, in other words, protrude by an angle δ of 50° relative to the fixation plate segments.

The connection of the osteosynthesis plate according to the invention allows in particular a controlled movement between the segments by a specific dimensioning of the connecting segment.

The two fixation plate segments and the connecting segment between the fixation plate segments are part of an integral osteosynthesis plate, especially a piece of metal. There are no gathers or hinges. Particularly preferably, the integral osteosynthesis plate is of monolithic construction, i.e., without connecting seams, e.g., welds or the like.

The connecting segment between the two fixation plate segments is angled by the anatomical demands of the pelvis between 30° and 80° compared to the two plates in the lateral plane, and between 0° and 30° compared to the longitudinal axis of each plate.

Overall, an implant is provided as an osteosynthesis plate with two plate segments connected by a flexible connecting segment that allows controlled movement between the two plates.

LIST OF REFERENCE SIGNS

1 Osteosynthesis plate
2 Fixation plate segment
3 Fixation plate segment

4 Flat connecting segment
5 Fixation point
6 First region
7 First minimum
8 Second region
9 First maximum
10 Third region
11 Second minimum
12 Interface/bend
13 Pelvic bone
100 Support surface
Pd1 Plate thickness (fixation plate segment)
Pd2 Plate thickness (flat connecting segment)
N Normal vector
F Force direction
Δs Deformation path
$l_1$ Total length (flat connecting segment)
b Width (flat connecting segment)
α Angle
δ Angle
r Shortest distance between two fixation points
$b_{max}$ Maximum width of the flat connecting segment
h Height of the flat connecting segment
$l_2$ Length of the fixation plate segment
$b_2$ Width of the fixation plate segment
AS Starting position

The invention claimed is:

1. An osteosynthesis plate for replacing a synarthrosis, wherein the osteosynthesis plate comprises:
two fixation plate segments configured to secure the osteosynthesis plate to two bones; and
a connecting segment interconnecting the two fixation plate segments, wherein the connecting segment protrudes from the two fixation plate segments,
wherein each of the two fixation plate segments defines a support surface configured to support the fixation plate segment on a pelvic edge,
wherein the connecting segment is configured to extend along an inner side of a pelvis,
wherein the connecting segment is configured in such a way that, in a unilaterally fixed state of the osteosynthesis plate, a first one of the two fixation plate segments is free-swinging and a second one of the two fixation plate segments is fixed, the free-swinging, first one of the two fixation plate segments is configured to be deflected relative to the fixed second one of the two fixation plate segments upon application of a force of 350 N from a direction parallel to a normal vector of the support surface of the free-swinging, first one of the two fixation plate segments by a distance of at least 1.5 mm.

2. The osteosynthesis plate of claim 1, wherein the support surface has a normal vector perpendicular to the support surface, and wherein the connecting segment is angled, at least in regions, by an angle of less than 45° relative to the normal vector of the support surface or a vector displaced parallel thereto relative to the two fixation plate segments.

3. The osteosynthesis plate of claim 1, wherein the connecting segment is a flat connecting segment with an average plate thickness that is at least 1.5 times less than an average width of the flat connecting segment.

4. The osteosynthesis plate of claim 1, wherein a length of the connecting segment is at least twice as long as a shortest distance between edges of the two fixation plate segments.

5. The osteosynthesis plate of claim 1, wherein a length of the connecting segment is at least five times as long as an average width of the connecting segment.

6. The osteosynthesis plate of claim 1, wherein the connecting segment has a "W" or "U" shape.

7. The osteosynthesis plate of claim 1, wherein the connecting segment is bent by an angle of more than 45° relative to a fictitious extension of the support surface of each of the fixation plate segments, with respect to the fictitious extension.

8. The osteosynthesis plate of claim 1, wherein the two the fixation plates each have at least two drilled holes configured for passage of a respective bone screw.

9. The osteosynthesis plate of claim 1, wherein the osteosynthesis plate is formed in one piece and consists of a ductile material that is titanium, stainless steel, or a metal alloy comprising titanium or iron.

10. The osteosynthesis plate of claim 1, wherein the two fixation plate segments and the connecting segment have a same plate thickness.

11. The osteosynthesis plate of claim 1, wherein the two fixation plate segments each have a longitudinal extension and a transverse extension perpendicular to the longitudinal extension, wherein the connecting segment is arranged at an edge and centrally relative to the longitudinal extension of the two fixation plate segments.

12. The osteosynthesis plate of claim 1, wherein an interface between a respective one of the two fixation plate segments and the connecting segment is formed as a bend with a bending radius that is at least larger than an average plate thickness of the connecting segment.

13. The osteosynthesis plate of claim 1, wherein the connecting segment is curved and convex towards fixation points of the two fixation plate segments.

* * * * *